United States Patent Office 3,660,454
Patented May 2, 1972

3,660,454
PROCESS OF MAKING AMINO SUBSTITUTED ORGANOSILICON COMPOUNDS AND THE COMPOUNDS MADE THEREBY
Gerald A. Gornowicz, Madison, Wis., and Samuel R. Wendel, Missoula, Mont., assignors to Dow Corning Corporation, Midland, Mich.
No Drawing. Filed Aug. 19, 1969, Ser. No. 851,486
Int. Cl. C07f 7/02
U.S. Cl. 260—448.8 R  5 Claims

ABSTRACT OF THE DISCLOSURE

Sulfur-substituted aminosilanes and siloxanes, and N-substituted aminosilanes and siloxanes are made by reacting silicon compounds having the group ≡SiR'SH with ethylene imine or N-substituted ethylene imines to give alkoxysilanes and siloxanes having the grouping
≡SiR'CH$_2$CH$_2$NHR''
The reaction is enhanced by the presence of an alcohol or zinc chloride. The products are useful as coupling agents between glass and phenolic resins.

---

Aminosilanes and siloxanes in which the amino group is attached to silicon through a carbon atom have heretofore been made by reacting chloroalkylsilanes with ammonia or with amines. In this reaction ammonium chloride, or an amine hydrochloride is a by-product. Since chlorine is eliminated from the product, and is a heavy element, considerable waste occurs during this process. Also when the reaction is with ammonia or a primary amine there is a great tendency to poly-substitute the nitrogen atom, thereby producing di- or trisilyl amines. Such products are not of great utility as compared with the mono-substituted amino compounds. This also contributes to low yields of the desired product.

It is the object of the present invention to prepare aminosilanes and siloxanes in which the reactants simply add thereby giving a yield of finished product equivalent in weight to the combined weight of the starting reactants.

Another object is to provide a method of preparing aminosilanes and siloxanes which avoid poly-substitution on the nitrogen atom.

The products of this invention are useful as coupling agents between glass and phenolic resins, epoxy resins and urethane resins. The products of this invention are also useful as intermediates in the formation of amino-containing siloxanes for use in polishes, water repellents and other compositions which are to be substantive to various surfaces.

In accordance with this invention a compound (1) of the formula ≡SiRSH is reacted with a compound of the formula

CH$_2$CH$_2$NR' whereby a compound of the formula (2)

≡SiRSCH$_2$CH$_2$NR'H is obtained, in which compounds R is a divalent hydrocarbon radical free of aliphatic unsaturation, R' is hydrogen, a monovalent hydrocarbon radical free of aliphatic unsaturation, an acyl radical or a divalent hydrocarbon radical substituted with substituents of the group consisting of hydroxyl, cyano, amino, halogen, and perfluoroalkyl radicals, the remaining valences of the silicon in (1) and (2), being satisfied by alkoxy groups, oxygen atoms of

SiOSi— linkages, monovalent hydrocarbon radicals and monovalent halohydrocarbon radicals.

This invention also relates to compounds of the formula ≡SiRSCH$_2$CH$_2$NR'H in which R is a divalent hydrocarbon radical free of aliphatic unsaturation, R' is hydrogen, a monovalent hydrocarbon radical free of aliphatic unsaturation, an acyl radical or a divalent hydrocarbon radical substituted with substituents selected from the group consisting of hydroxyl, cyano, amino, halogen, and perfluoroalkyl radicals, the remaining valences of the silicon in said compound being satisfied by alkoxy groups, oxygen atoms of SiOSi bonds, monovalent hydrocarbon radicals or monovalent halohydrocarbon radicals.

The best method of preparing the compounds for this invention is by reacting a mercaptosilane as above defined with ethylene imine or a N-substituted ethylene imine as above defined. Reaction occurs slowly upon mixing the two reactants, but in the absence of a catalyst or a promoter, reaction may require several days. Preferably, the reaction is carried out in the presence of an alcohol promoter which speeds up the reaction considerably as shown in the following examples.

For the purpose of this invention any alcohol compatible with the mixture can be employed, such as monohydric alcohols, such as methanol, ethanol, isopropanol, butanol, hexanol, or octadecanol, the monomethyl ether of ethylene glycol, the monoethyl ether of diethylene glycol, benzyl alcohol, beta-phenylethanol, beta-phenylpropanol, cyclohexanol, cyclopentanol, hexenyl alcohol, or allyl alcohol; or polyhydric alcohols such as ethylene glycol or glycerine. The amount of alcohol employed is not critical, although to obtain appreciable increase in rate at least 1% alcohol based on the amount of reactants should be employed.

The reaction of this invention can also be enhanced considerably by employing zinc chloride as a catalyst. Again, the amount of catalyst is not critical, but generally a catalytic amount is sufficient to enhance the reaction. The combination of zinc chloride and alcohol can be employed, if desired.

A second less preferred method can be employed in making the compositions of this invention which involves the addition of a mercapto amine such as mercaptoethylamine to an alkenyl group substituted on the silicon atom. This reaction is generally enhanced by the presence of a free radical catalyst such as peroxides or bis-azonitriles. In this reaction the mercapto group adds preferentially to the unsaturated group of alkenyl radical producing the aminosilanes of this invention.

The starting mercaptosilanes and siloxanes of this invention are known compounds and can be any of those in which R is any divalent hydrocarbon radical such as methylene, dimethylene, trimethylene, hexamethylene or octadecamethylene; or any branched alkylene radical such as —CH$_2$CH(Me)CH$_2$—; any cycloalkylene radical such as cyclohexylene or cyclopentylene; or any arylene radical such as phenylene, xylene, tolylene, xylylene or naphthylene; or any aralkylene radical such as —CH$_2$C$_6$H$_4$—, —CH$_2$CH(Me)C$_6$H$_4$— or —(CH$_2$)$_2$C$_6$H$_4$(CH$_2$)$_2$—.

It should be understood that when mercapto siloxanes are used it is not necessary that there by a mercapto group on each Si atom. The siloxanes can be copolymers of mercapto siloxanes and hydrocarbon or halohydrocarbon substituted siloxanes as shown in the examples. The number of substituent groups on any on Si atom can range from 0 to 3.

The ethylene imine starting materials of this invention are known products of commerce. Ethylene imine itself is prepared by the reaction of ammonia with 1,2-ethylene dichloride. Those compounds in which the nitrogen is substituted are prepared by reacting ethylene imine with an olefin or an olefin containing the substituents shown above. For example, where R' is a hydroxyl-substituted radical one would add an unsaturated alcohol to ethylene imine, or where R is a cyano-substituted radical one would add an unsaturated cyanide to ethylene imine, etc. These reactions are well known, so no further description of that preparation is needed here.

A second method of preparing the N-substituted imines involve the use of amines rather than ammonia in the reaction with ethylene dichloride. For example, ethylene dichloride reacted with methyl amine would give a compound in which R' is a methyl radical.

For the purpose of this invention R' can be hydrogen or any monovalent hydrocarbon radical free of aliphatic unsaturation such as alkyl radicals such as methyl, ethyl, propyl, isopropyl, butyl or octadecyl; cycloaliphatic radicals such as cyclohexyl, cyclopentyl, methylcyclohexyl or dimethylcyclohexyl; aryl hydrocarbon radicals such as phenyl, tolyl, xylyl or xenyl; and aralkyl hydrocarbon radicals such as beta-phenylethyl, beta-phenylpropyl or —CH$_2$CH$_2$C$_6$H$_4$CH$_2$CH$_3$. R' can also be any of the above hydrocarbon radicals which are substituted with a hydroxyl, a cyano, an amino, a halogen atom or a perfluoroalkyl radical. The halogen can be any halogen, that is, chlorine, bromine, iodine or fluorine. The perfluoroalkyl radicals can be trifluoromethyl, perfluoroisobutyl, perfluoro-octadecyl or perfluoroheptyl.

R' can also be any acyl radical such as carboxy acyl radicals such as acetyl, propionyl, octonoyl, 2-ethylhexoyl stearyl and formyl.

The temperature and pressure at which the process of this invention is carried out is not critical, but in general, temperatures ranging from 0 to 100° C. are sufficient.

In the following examples the following abbreviations are employed; Me for the methyl radical, Et for the ethyl radical, Ph for the phenyl radical and Vi for the vinyl radical.

The following examples are illustrative only and should not be construed as limiting the invention which is properly delineated in the appended claims.

EXAMPLE 1

Examples 1 and 2 illustrate the preparation of the compounds of this invention by the addition of mercaptan to vinyl or silicon.

Tris-trimethylsiloxyvinylsilane was mixed with beta-mercaptoethylamine in amount of 0.35 equivalent of vinyl for 0.35 equivalent of mercapto groups in isopropanol solvent. 1.5 g. of azo-bis-isobutyronitrile was added and the mixture was heated 144 hours at 90° C. There was obtained the compound (Me$_3$SiO)$_3$SiCH$_2$CH$_2$SCH$_2$CH$_2$NH$_2$

EXAMPLE 2

Equimolar amounts of vinylpenta-methyldisiloxane and beta-mercaptoethylamine were mixed in a solvent composed of 16 parts isopropanol and 3 parts heptane and with .13 g. of azo-bis-isobutyronitrile and heated for 74 hours at 75° C. There was obtained the compound Me$_3$SiOSi(Me$_2$)(CH$_2$CH$_2$SCH$_2$CH$_2$NH$_2$)

The remaining examples illustrate the best method of preparing the compounds of this invention.

EXAMPLE 3

To 55 ml. (1 mol) of ethylene imine was added 196 g. of gamma-mercaptopropyltrimethoxysilane. The mixture was allowed to stand at room-temperature for 12 days at which time the reaction was 90% complete as shown by vapor-phase chromatographic analysis. Distillation of the product under reduced pressure yielded 169.4 g. of (MeO)$_3$Si(CH)$_3$S(CH$_2$)$_2$NH$_2$ which had the following properties:

B.P. 89 to 91° C. at .05 mm., $n_D^{25}$ 1.4667, $d_4^{25}$ 1.063, R$_D$ observed .2609, calc. .2614, neutral equivalent 241, calculated 239.

EXAMPLE 4

To a stirred mixture of 98 g. of 3-mercaptopropyltrimethoxysilane and .5 g. of zinc chloride was added 21.5 g. of ethylene imine in a dropwise manner. The temperature rose to 135° C. before cooling was applied. On the completion of the addition of the imine, vapor-phase chromatography showed that the reaction was 81% complete. The mixture was heated overnight at 65° C. to give 90% yield of the product (MeO)$_3$Si(CH$_2$)$_3$S(CH$_2$)$_2$NH$_2$

EXAMPLE 5

This example shows the enhancing effect of the presence of alcohol. 1 mol of ethylene imine was added to a solution of 1 mol of gamma- or 3-mercaptopropyltrimethoxysilane in 200 ml. of methanol. An immediate exothermic reaction began and produced a 60% yield of the product shown below immediately. Refluxing the mixture for 24 hours gave a 78% yield of the product (MeO)$_3$Si(CH$_2$)$_3$S(CH$_2$)$_2$NH$_2$.

EXAMPLE 6

A mixture of 210 g. of 3-mercaptopropyltrimethoxysilane and 71 g. of n-ethylethylene imine containing a catalytic amount of sodium methoxide was heated at gentle reflux for 17 days. Distillation of the product under reduced pressure gave the compound (MeO)$_3$Si(CH$_2$)$_3$S(CH$_2$)$_2$NHEt which had the following properties: B.P. 83 to 85° C. at .07 mm., $d_4^{25}$ 1.019, $n_D^{25}$ 1.4587, R$_D$ observed .2687, calc. .2627, neutral equivalent 264.7, calc. 267.

EXAMPLE 7

A mixture of 98.1 g. of beta-mercaptopropyltrimethoxysilane and 50 ml. of N-beta-aminoethylethylene imine containing a catalytic amount of sodium methoxide was heated at 85 to 95° C. for 10 days. Vacuum distillation of the product afforded the compound (MeO)$_3$Si(CH$_2$)$_3$S(CH$_2$)$_2$NH(CH$_2$)$_2$NH$_2$

EXAMPLE 8

A mixture of 98.1 g. of 3-mercaptopropyltrimethoxysilane and 45 ml. of N-acetylethylene imine was heated at 50 to 55° C. for 24 hours. Vacuum distillation of the product yielded (MeO)$_3$Si(CH$_2$)$_3$S(CH$_2$)$_2$NHCOMe having the following properties: B.P. 150 to 153° C. at .03 mm., $d_4^{25}$ 1.106, $n_D^{25}$ 1.4750, R$_D$ observed 2546 calc. 2566.

EXAMPLE 9

When the following siloxanes are reacted with the following N-substituted ethylene imines in the process of Example 5, the following products are obtained.

| Siloxane | Imine | Product |
|---|---|---|
| Cyclictetrasiloxane | | Cyclictetrasiloxane. |
| (Me₂SiO)₃Me(HSCH₂)SiO | ĊH₂CH₂N(CH₂)₃OH | HO(CH₂)₃NH(CH₂)₂SCH₂(Me)SiO(Me₂SiO)₃. |
| Copolymer of—<br>25 mol percent PhSiO₁.₅<br>25 mol percent ViSiO₁.₅<br>25 mol percent Et₂SiO<br>25 mol percent OSi(C₆H₁₁)(CH₂CH(Me)-CH₂SH). | ĊH₂CH₂N(CH₂)₃Cl | Copolymer of—<br>25 mol percent PhSiO₁.₅.<br>25 mol percent ViSiO₁.₅.<br>25 mol percent Et₂SiO.<br>25 mol percent Cl(CH₂)₃NH(CH₂)₂SCH₂CH(Me)-CH₂Si(C₆H₁₁)O. |
| [HSC₆H₄(Me₂)SiO]₄Si | ĊH₂CH₂N(CH₂)₂CF₃ | [CF₃(CH₂)₂SC₆H₄(Me₂)SiO]₄Si. |
| Copolymer of—<br>10 mol percent ClC₆H₄SiO₁.₅<br>10 mol percent C₆H₅C₆H₄SiO₁.₅<br>10 mol percent HSC₆H₁₀SiO₁.₅<br>70 mol percent PhMeSiO | ĊH₂CH₂NMe | Copolymer of—<br>10 mol percent ClC₆H₄SiO₁.₅.<br>10 mol percent C₆H₅C₆H₄SiO₁.₅.<br>10 mol percent MeNH(CH₂)₂SC₆H₁₀SiO₁.₅<br>70 mol percent PhMeSiO. |

EXAMPLE 10

When the following alkoxysilanes are reacted with the following imines in accordance with the procedure of Example 5, the following products are obtained.

| Alkoxysilane | Imine | Product |
|---|---|---|
| HSCH₂C₆H₄Si(OEt)₃ | ĊH₂CH₂NC₆H₅ | C₆H₅NH(CH₂)₂SCH₂C₆H₄Si(OEt)₃ |
| HSC₆H₄(CH₂)₂Si(OCH₂CH₂OMe)₃ | ĊH₂CH₂NC₆H₉Cl | ClC₆H₉NH(CH₂)₂SC₆H₄(CH₂)₂Si(OCH₂CH₂OMe)₃ |
| HS(CH₂)₁₈Si(OMe)₃ | ĊH₂CH₂NCOC₃H₇ | C₃H₇CONH(CH₂)₂S(CH₂)₁₈Si(OMe)₃ |
| (C₆H₅CH₂CH₂)(HS(CH₂)₃)Si[O(CH₂CH₂O)₂Et]₂ | ĊH₂CH₂NH | [H₂N(CH₂)₂S(CH₂)₃](C₆H₅CH₂CH₂)Si[O(CH₂CH₂O)₂Et]₂ |
| (HSCH₂CH₂)(C₁₈H₃₇)Si(OMe)₂ | ĊH₂CH₂NH | H₂N(CH₂)₂S(CH₂)₂(C₁₈H₃₇)Si(OMe)₂ |
| (HSCH₂CH₂CH₂)(CF₃CH₂CH₂)Si(OMe)₂ | ĊH₂CH₂NH | (H₂N(CH₂)₂SCH₂CH₂CH₂)(CF₃CH₂CH₂)Si(OMe)₂ |
| HSCH₂CH₂CH(Me)₂SiOMe | ĊH₂CH₂NC₁₈H₃₇ | C₁₈H₃₇NH(CH₂)₂SCH₂CH₂CH₂(Me₂)SiOMe |
| HS(CH₂)₃Si(OMe)₃ | ĊH₂CH₂NCH₂CH₂C₆H₅ | C₆H₅NH(CH₂)₂S(CH₂)₃Si(OMe)₃ |
| HS(CH₂)₃Si(OMe)₃ | ĊH₂CH₂NCOC₁₇H₃₅ | C₁₇H₃₅CONH(CH₂)₂S(CH₂)₃Si(OMe)₃ |
| HS(CH₂)₃Si(OMe)₃ | ĊH₂CH₂N(CH₂)₃CN | NC(CH₂)₃NH(CH₂)₂S(CH₂)₃Si(OMe)₃ |

EXAMPLE 11

Equivalent results are obtained when the following alcohols are substituted in the procedure of Example 5: ethanol, isopropanol, hexyl alcohol, benzyl alcohol, cyclohexanol, the monomethyl ether of ethylene glycol, the monoethyl ether of diethylene glycol, ethylene glycol, the monomethyl ether of propylene glycol and propargyl alcohol.

That which is claimed is:

1. The method comprising reacting
(1) a compound of the formula ≡SiRSH with a compound
(2) of the formula

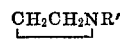

CH₂CH₂NR' in the presence of an alcohol in amount of at least 1% by weight based on the weights of (1) and (2), whereby a compound of the formula
(3) ≡SiRSCH₂CH₂NR'H is obtained in which compounds R is a divalent hydrocarbon radical free of aliphatic unsaturation, R' is hydrogen, a monovalent hydrocarbon radical free of aliphatic unsaturation, an acyl radical or a hydrocarbon radical having substituents selected from the group consisting of hydroxyl, cyano, amino, halogen and perfluoroalkyl radicals, the remaining valences of the silicon in (1) and (3) being satisfied by alkoxy groups of 1 to 6 carbon atoms, oxygen atoms of SiOSi linkages, monovalent hydrocarbon radicals of from 1 to 18 carbon atoms selected from the group consisting of alkyl, alkenyl, aryl, aralkyl and saturated cycloaliphatic hydrocarbon radicals or halohydrocarbon radicals of the group consisting of halophenyl and 3,3,3-trifluoropropyl radicals.

2. The method of claim 1 in which the alcohol is methanol.

3. The method comprising reacting
(1) a compound of the formula ≡SiRSH with a compound of the formula (2)     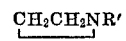

CH₂CH₂NR' in the presence of a catalytic amount of zinc chloride, whereby a compound of the formula
(3) ≡SiRSCH₂CH₂NR'H is obtained in which compound R is a divalent hydrocarbon radical free of aliphatic unsaturation, R' is hydrogen, a monovalent hydrocarbon radical free of aliphatic unsaturation, an acyl radical or a hydrocarbon radical having substituents selected from the group consisting of hydroxyl, cyano, amino, halogen and perfluoroalkyl radicals, the remaining valences of the silicon in (1) and (3) being satisfied by alkoxy groups of 1 to 6 carbon atoms, oxygen atoms of SiOSi linkages, monovalent hydrocarbon radicals of from 1 to 18 carbon atoms selected from the group consisting of alkyl, alkenyl, aryl, aralkyl and saturated cycloaliphatic hydrocarbon radicals or halohydrocarbon radicals of the group consisting of halophenyl and 3,3,3-trifluoropropyl radicals.

4. The method of claim 3 in which an alcohol is present in amount of at least 1% by weight based on the weight of (1) and (2).

5. The method of claim 4 in which the alcohol is methanol.

References Cited

UNITED STATES PATENTS

| | | | |
|---|---|---|---|
| 3,215,718 | 11/1965 | Ryan | 260—448.2 N |
| 3,328,451 | 6/1967 | Bulbenko | 260—448.2 N |
| 3,278,484 | 10/1966 | Tesoro | 260—448.2 X |
| 3,488,373 | 1/1970 | Berger | 260—448.8 R |

TOBIAS E. LEVOW, Primary Examiner

W. F. W. BELLAMY, Assistant Examiner

U.S. Cl. X.R.

260—448.2 N, 448.2 E, 448.2 B